US012506930B2

(12) United States Patent
Kalam et al.

(10) Patent No.: US 12,506,930 B2
(45) Date of Patent: Dec. 23, 2025

(54) DYNAMIC ADJUSTMENT OF DISPLAY SETTINGS BASED ON VIEWER

(71) Applicant: DISH Network Technologies India Private Limited, Karnataka (IN)

(72) Inventors: Arun Pulasseri Kalam, Bengaluru (IN); Manigandan Subramani, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/544,072

(22) Filed: Dec. 18, 2023

(65) Prior Publication Data

US 2025/0203159 A1   Jun. 19, 2025

(51) Int. Cl.
*H04N 21/442* (2011.01)
*H04N 21/443* (2011.01)
*H04N 21/45* (2011.01)
*H04N 21/485* (2011.01)

(52) U.S. Cl.
CPC ..... *H04N 21/44218* (2013.01); *H04N 21/443* (2013.01); *H04N 21/4532* (2013.01); *H04N 21/485* (2013.01)

(58) Field of Classification Search
CPC .......... H04N 21/44218; H04N 21/443; H04N 21/4532; H04N 21/485
See application file for complete search history.

(56) References Cited

U.S. PATENT DOCUMENTS

| 2015/0264299 A1* | 9/2015 | Leech | H04N 7/0117 348/78 |
| 2016/0005146 A1* | 1/2016 | Thurling | G09G 3/2092 345/661 |
| 2020/0128296 A1* | 4/2020 | Wang | G06F 3/1446 |

* cited by examiner

*Primary Examiner* — Chenea Davis
(74) *Attorney, Agent, or Firm* — Seed Intellectual Property Law Group LLP (57) ABSTRACT

Systems and methods for dynamically adjusting display settings based on a distance between a user and a display device. A user who is viewing content that is being displayed on the display device is identified. A distance between the user and the display device is also determined. At least one display setting associated with the user is selected based on the determined distance. And the display of the content on the display device is automatically adjusted based on the selected display setting.

19 Claims, 5 Drawing Sheets

DYNAMIC ADJUSTMENT OF DISPLAY SETTINGS BASED ON VIEWER

BACKGROUND

Over the past few years, home-theater systems have greatly improved the presentation of content to users, such as in how users view content. This improvement has been aided by the number of content channels that are available to watch at any given time, the quality of video output devices, and the quality of the input signal carrying the content. Presentation of content, however, generally does not account for the actual watching environment. It is with respect to these and other considerations that the embodiments herein have been made.

BRIEF SUMMARY

Briefly, embodiments descried herein are directed to dynamically adjusting display settings based on a distance between a user and a display device 1. When content is being displayed to a user on the display device, a distance between the user and the display device is determined. In some embodiments, the specific user viewing the content is also identified. One or more display setting associated with the user are selected based on the determined distance. In some embodiments, a viewing profile of the user is accessed to identify those display settings that map to the determined distance. The display of the content on the display device is then automatically adjusted based on the selected display setting. In some embodiments, if the user further adjusts or modifies the display settings, then the viewing profile is updated based on the modified display settings and the determined distance. In this way, the system can learn the preferred display settings for the user when the user is at different distances from the display device.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References herein to the term "user" refer to a person or persons who is or are accessing a website to be displayed on a display device. Accordingly, a "user" more generally refers to a person or persons consuming content on a website. Although embodiments described herein utilize user in describing the details of the various embodiments, embodiments are not so limited. For example, in some implementations, the term "user" may be replaced with the term "viewer" throughout the embodiments described herein.

References herein to the term "content" refer to audio, visual, or audiovisual content that is presented to a user via a website that is being accessed. Examples of content include text, graphics, video, audio, or other information presented to the user, which may include, but is not limited to, television or radio programs, sports broadcasts, news feeds, advertisements, and other types of displayable or audible content. Content can include "primary content" or "secondary content" or a combination thereof. "Primary content" is content that is selected by a website or its developer or its administrator to be presented to the user via the website. "Secondary content" refers to content that that is selected by a third party, separate from the website, to be presented to the user via the website. For example, in some embodiments, the secondary content may be an advertisement that is presented to the user in a banner or slot on a website.

Figure 1:
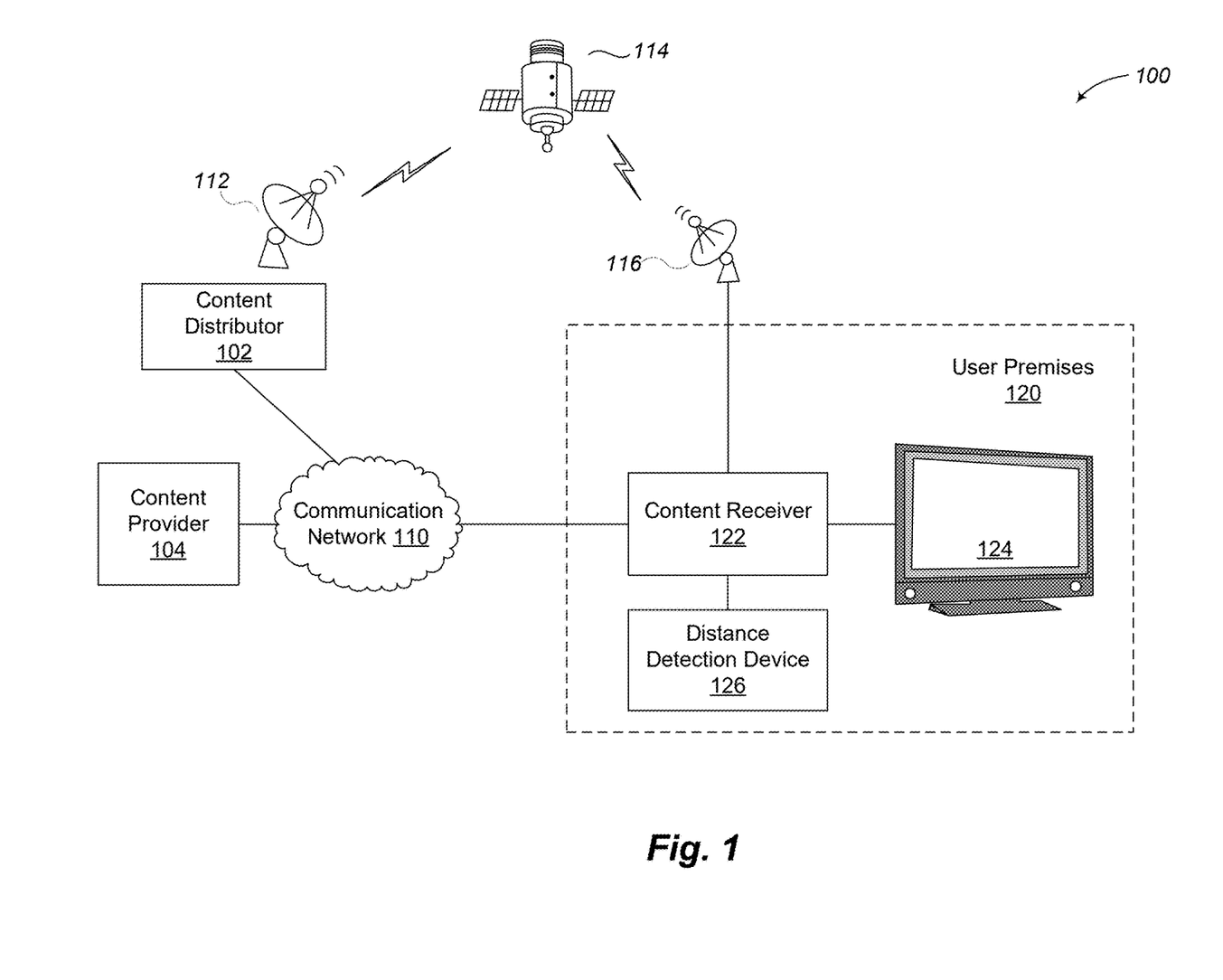
FIG. 1 illustrates a context diagram of an environment for providing content to a user in accordance with embodiments described herein.

FIG. 1 illustrates a context diagram of an environment 100 for providing content to a user in accordance with embodiments described herein. Environment 100 includes content providers 104, content distributor 102, communication network 110, and user premises 120.

User premises 120 includes a content receiver 122, a display device 124, and a distance detection device 126. The content receiver 122 is a computing device that receives content for presentation on the display device 124 to a user (also referred to as a viewer) on the user premises 120. In some embodiments, the content received by the content receiver 122 is or includes audio content for presentation on one or more audio output devices (not illustrated). Examples of content receiver 122 may include, but are not limited to, a set-top box, a cable connection box, a computer, television receiver, radio receiver, or other content receivers. The display device 124 may be any kind of visual content display device, such as, but not limited to a television, monitor, projector, or other display device.

The content receiver 122 is configured to identify the user that is viewing the content being displayed on the display device 124 and automatically adjust display settings for that user based on a distance (also referred to as a viewing distance) between the user and the display device 124, as described herein. In various embodiments, the content receiver 122 receives information or data from a distance detection device 126 to determine the distance between the user and the display device 124. The distance detection device 126 may be any kind of sensor system that is configured to obtain information or data utilized by the content receiver 122 to determine a distance between the user and the display device 124. The distance detection device 126 may be a camera that captures images of the user, a LiDAR sensor that detects a distance or location of the user relative to the display device 124, or other sensing system that detects a distance between the user and the display device 124.

The content distributor 102 is configured to receive content from one or more content providers 104 and provide that content to the content receiver 122 through a variety of different distribution mechanisms. For example, in some embodiments, content distributor 102 may provide the content to the content receiver 122 directly through communication network 110. In other embodiments, the content may be sent through uplink 112, which goes to satellite 114 and back to downlink station 116 that may also include a head end (not shown). The content is then sent to the content receiver 122. Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks, which may include cellular networks.

Typically, content providers 104 generate, aggregate, and/or otherwise provide content that is provided to one or more viewers. Sometimes, content providers are referred to as "channels" or "stations." Examples of content providers 104 may include, but are not limited to: film studios; television studios; network broadcasting companies; independent content producers, such as AMC, HBO, Showtime, or the like; radio stations; or other entities that provide content for viewer consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, songs, audio tracks, albums, or the like. In this context, program content may also include commercials or other television or radio advertisements. It should be noted that the commercials may be added to the program content by the content providers 104 or the content distributor 102. Embodiments described herein generally refer to content, which includes visual content, audio content, or audiovisual content that includes a video and audio component.

Figure 2:
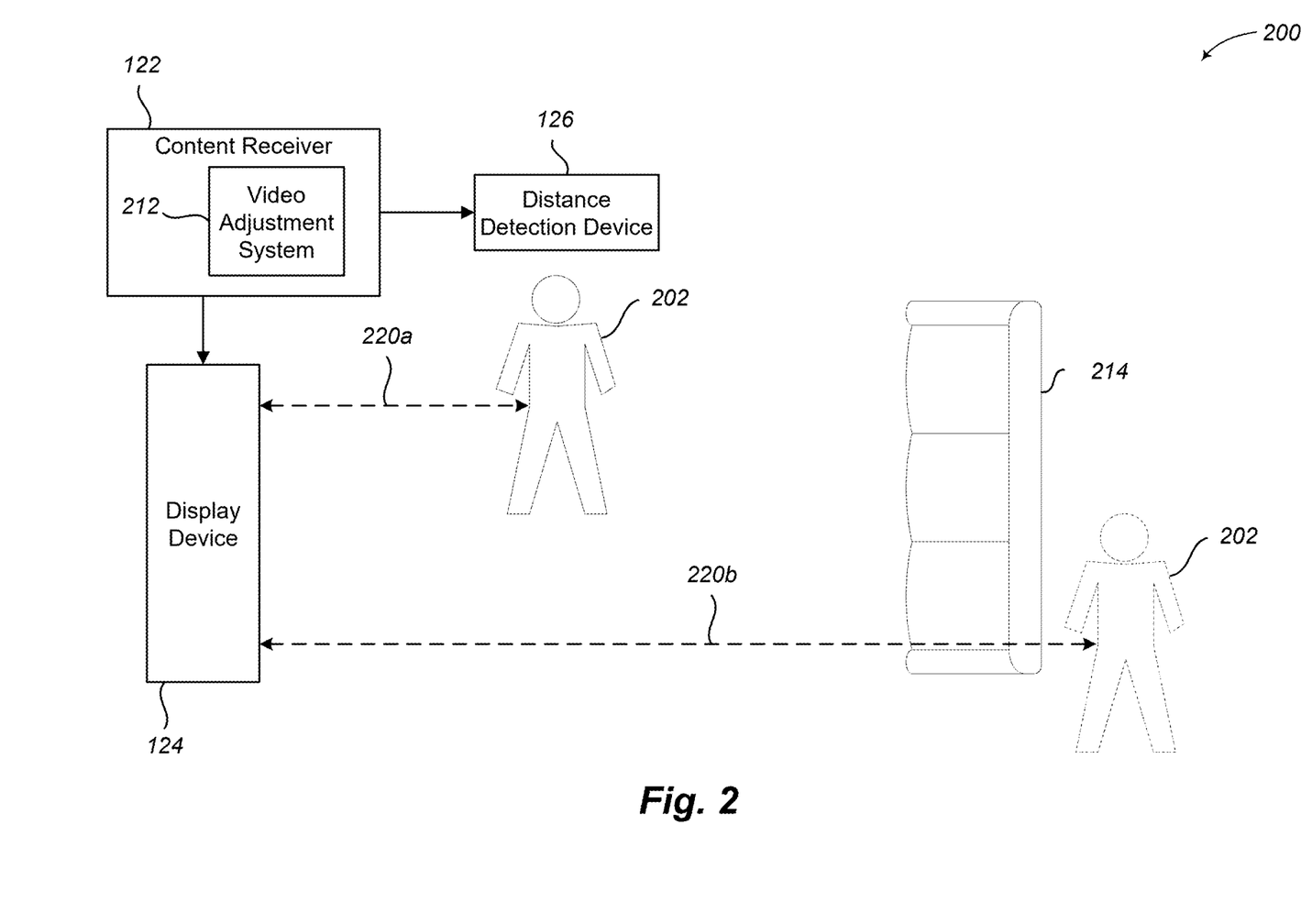
FIG. 2 is a context diagram of a non-limiting embodiment of a user's premises for presenting content to the user in accordance with embodiments described herein.

FIG. 2 is a context diagram of a non-limiting embodiment of a user's premises 200 for presenting content to the user in accordance with embodiments described herein. User's premises 200 may be an embodiment of user premises 120 in FIG. 1. Accordingly, user's premises 200 may include content receiver 122, display device 124, and distance detection device 126. User's premises 200 may also include user 202.

The content receiver 122 may include a video adjustment system 212. The video adjustment system is configured to determine a distance 220 between the user and the display device 124 and to adjust or modify display settings of content being displayed on the display device 124 based on that distance 220. In various embodiments, the video adjustment system 212 obtains or receives information from distance detection device 126 to determine distance 220. In at least one embodiment, the distance detection device 126 may be a LiDAR sensor that is positioned at a known location relative to the display device 124. The video adjustment system 212 can then determine distance 220 between the user 202 and the display device.

As described herein, the video adjustment system 212 can dynamically adjust the display settings of the content being displayed on the display device 124 over time. For example, at a first time, the user 202 may be detected as being positioned on the user's premises 200 at distance 220a. The video adjustment system 212 selects and adjusts one or more first display settings based on that distance 220a. At a second time, the user 202 may have moved behind couch 214 and is now detected at distance 220b, which is a greater (i.e., the user 202 is further away) from the display device 124. The video adjustment system 212 selects and adjusts one or more second display settings based on that distance 220b. In some embodiments, the video adjustment system 212 selects and adjust the same display settings but to different values or settings for the different distances 220a and 220b. In other embodiments, the video adjustment system 212 selects and adjust the separate display settings for the different distances 220a and 220b.

Accordingly, the display settings of content being displayed on the display device 124 can be dynamically customized for the user 202 based on the distance 220 the user 202 is away from the display device 124.

The operation of certain aspects will now be described with respect to FIGS. 3 and 4. Processes 300 and 400 described in conjunction with FIGS. 3 and 4, respectively, may be implemented individually or collectively by one or more processors or executed individually or collectively via circuitry on one or more computing devices, such as content receiver 124 in FIG. 1.

Figure 3:
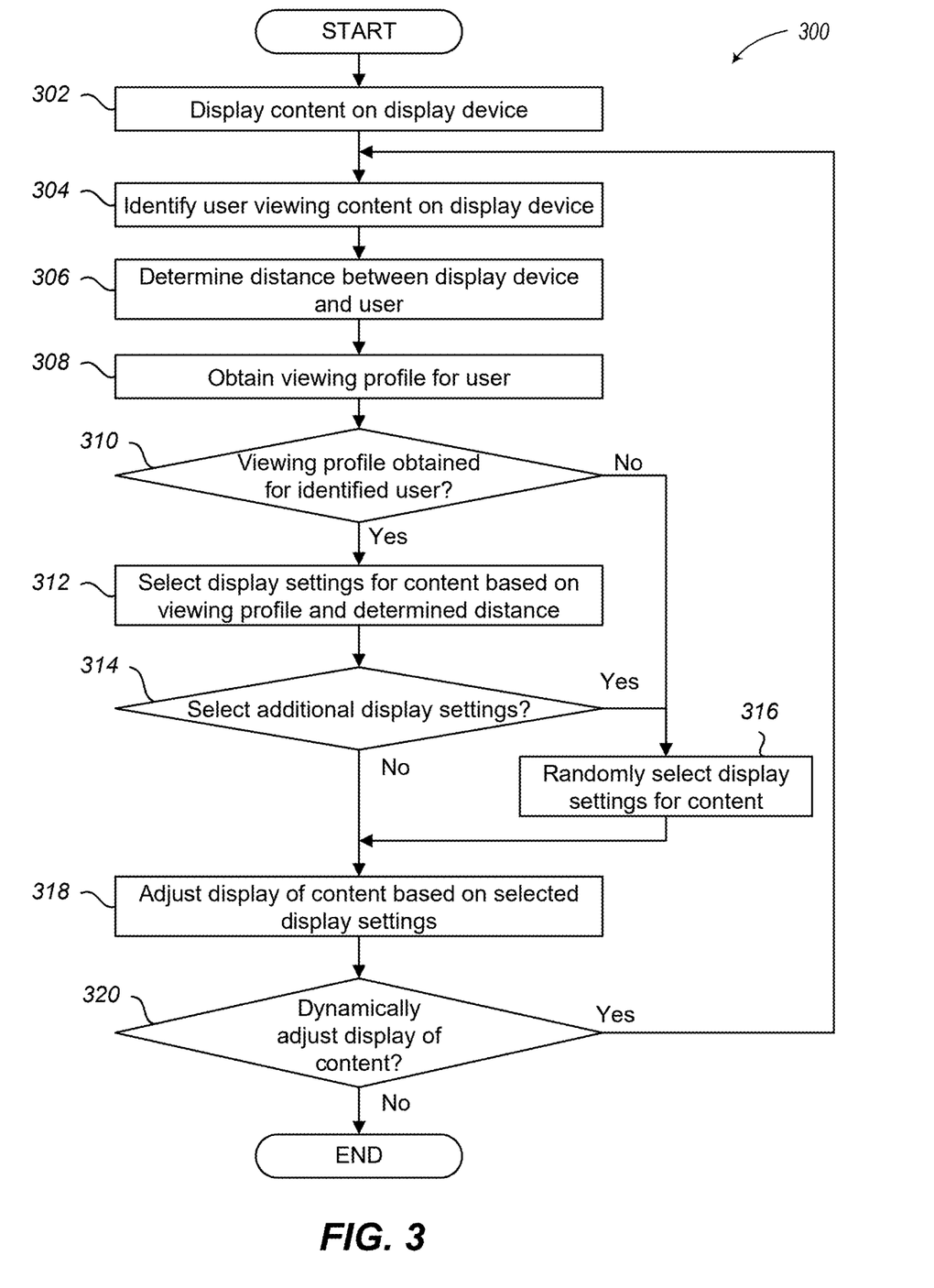
FIG. 3 illustrates a logical flow diagram showing one embodiment of an overview process for adjusting the display of content in accordance with embodiments described herein.

FIG. 3 illustrates a logical flow diagram showing one embodiment of an overview process 300 for adjusting the display of content to a user in accordance with embodiments described herein.

Process 300 begins, after a start block, at block 302, where content is displayed on a display device (e.g., display device 124 in FIG. 2). In various embodiments, the content is received by the content receiver from a content distributor for display on the display device. The content may include visual or audiovisual content, which may be received as one or more data streams.

Process 300 proceeds after block 302 to block 304, where a user is identified as viewing the content on the display device. In some embodiments, the user may be identified by utilizing a camera that captures images of the user. Image processing techniques can then be employed on the captured image to identify the specific user, such as by detecting a match between the captured image of a user and a stored image of known user. In other embodiments, a specific user may be identified by user input. For example, when selecting the content to view, the user may select a unique user profile that corresponds to that user. As another example, the user may enter a unique password or passcode that corresponds to that user. In yet other embodiments, a device identifier may be received from a mobile device (e.g., a smartphone, smartwatch, tablet computer, etc.) of the user. In such an embodiment, a database of known device identifiers may be maintained, and the user may be identified in response to a match between a known device identifier and the received device identifier.

Process 300 continues after block 304 at block 306, where a distance between the display device and the identified user is determined. In some embodiments, one or more cameras may capture images of the user, and image processing techniques may be used determine a location of the user relative to the display device. This location can then be used to determine the distance between the user and the display device. In other embodiments, a LiDAR sensor positioned at a known location relative to the display device may be used to determine the distance between the display device and the user. In yet other embodiments, WiFi reflected signals may be utilized to determine a position or location of the user relative to the display device, which can be used to determine the distance between the display device and the user.

Process 300 proceeds next after block 306 to block 308, where a viewing profile is obtained for the identified user. The content receiver, or a separate or remote database, may store separate viewing profiles for separate users. In some embodiments, no viewing profile may be obtained, such as when a new user is identified as viewing the content on the display device.

Each viewing profile may include one or more display settings for various content for the corresponding user. These display settings may have been set by the user or automatically selected or adjusted by employing embodiments described herein. The display settings may include, but are not limited to, brightness, contrast, color control, sharpness, aspect ratio, etc.

Each viewing profile may include a table or other data structure that lists separate display settings for separate distances. Thus, each viewing profile includes a mapping or correspondence between different distances (between the user and the display device) and different values or settings for one or more display settings. For example, at a first distance, each of one or more first display settings may have a first value or first setting, but at a second distance, each of one or more second display settings may have a second value or second setting. In some embodiments, the one or more first display settings may be the same as the one or more second display settings. In this way, each display settings has a corresponding or mapped value or setting for each separate distance. In other embodiments, at least one of the one or more first display settings may be different from the one or more second display settings. In this way, some display settings may have a corresponding or mapped value or settings for one distance, but not for another. Although this example mentions two distances, embodiment are not so limited. Rather, each user profile may have a mapping for a plurality of different distances. Moreover, the distances in each profile may be the same or different.

Process 300 continues next after block 308 at decision block 310, where a determination is made whether a viewing profile is obtained for the identified user. If no viewing profile is obtained, then process 300 flows to block 316; otherwise, process 300 flows to block 312.

At block 312, display settings for the content are selected based on the obtained viewing profile and the determined distance between the user and the display device. In at least one embodiment, the viewing profile is accessed and one or more display settings that are mapped or correspond to the determined distance are selected or obtained from the viewing profile. In this way, the values or settings for one or more display settings are selected based on the determined distance between the user or group of users and the display device.

In some embodiments, display settings may also be selected based on the content specifically being displayed on the display device. In at least one such embodiment, the viewing profile may store separate display settings for different distances for different types of content. For example, sports content may have one set of display settings and corresponding distances, whereas theatrical movie content may have a second set of display settings and corresponding distances. In this way, the display settings can be specified for a plurality of different types of content.

In some other embodiments, the display settings may be selected based on the display device that is displaying the content. For example, different types of display devices may have different display settings selected due to differences in how the display technology work, or preferences of the user for the different display technologies. Similarly, display devices having different sizes may also have different display settings selected for the user for different distances.

Process 300 proceeds after block 312 to decision block 314, where a determination is made whether addition display settings are selected for adjustment. In some embodiments, this determination is made based on the number or type of display settings selected at block 312. In other embodiments, this determination is made whether a test mode is to be implemented to determine if the user further modifies the display settings after they are adjusted. In this way, the viewing profile for the user can be further defined and improved. If additional display settings are to be selected, process 300 flows to block 316; otherwise, process 300 flows to block 318.

At block 316, one or more additional display settings may be randomly selected for the user based on the distance determined at block 306. In some embodiments, these display settings may be randomly selected from a plurality of possible display settings. In other embodiments, the randomly selected display settings may be obtained by crowdsourcing display settings for the determined distance from other users of similar demographics to the identified user or in a similar geographic area as the user. The randomly selected display settings may be used to predict or test the display settings for the identified user at the determined distance to see if the user make additional changes to the display settings. In this way, the system can force or cause the user to select the display settings that are to be stored in the viewing profile for that user. After block 316, process 300 proceeds to block 318.

At block 318, the display of the content is automatically adjusted based on the selected display settings. In this way, the system described herein learns what the user appreciates or prefers in display settings and automatically adjusts the content display accordingly.

In various embodiments, the one or more selected display settings are automatically changed to the corresponding value or setting selected for the determined distance. For example, the selected display settings may be brightness having a first corresponding value and contrast having a second corresponding value. In this example, the brightness and the contrast of the displayed content is adjusted to the first and second corresponding values, respectively.

Process 300 continues after block 318 to decision block 320, where a determination is made whether the display of the content is to be dynamically adjusted throughout the display of the content. In some embodiments, the content display may be adjusted a single time prior to or at a start of when the content is being displayed on the display device. In other embodiments, the system may continuously identify the user viewing the content and the distance between the user and the display device. In this way, the system can dynamically adjust the display of the content as the user move relative to the display device or if the user viewing the content changes. If the display of the content is to be dynamically changed, then process 300 loops to block 304; otherwise, process 300 terminates or otherwise returns to a calling process to perform other actions.

Although process 300 is described as identifying an individual user as viewing the content at block 304, embodiments are not so limited. In some embodiments, a plurality of users may be identified as viewing the content at block 304. If a plurality of users are identified as viewing the content, one or more distances may be determined at block 306. In some embodiments, a plurality of distances may be determined for the plurality of users, where each separate distance is determined for each separate user. In other embodiments, a single distance may be determined for a plurality of users, such as a minimum, maximum, average, or median distance the plurality of users are away from the display device. In at least one embodiment, a single distance may be determined for the plurality of users if the plurality of users share or are associated with a group viewing profile.

If a plurality of users are identified as viewing the content, then, at block 308, one or more viewing profiles are obtained for each identified user or a group of identified users. In some embodiments, a plurality of viewing profiles are obtained for the plurality of identified users. In other embodiments, a single viewing profile is obtained for a group of a plurality of identified users. In such an embodiment, if multiple users are identified at block 304 as viewing the content, then a group viewing profile most closely associated with identified users may be obtained. For example, if four users are identified as viewing the content, but a group viewing profile is associated with the combination of three of those users, then that group viewing profile may be obtained. In some embodiments, multiple separate group viewing profiles may be obtained for separate groups simultaneously viewing the content on the display device.

If multiple profiles are obtained at block 308 for multiple users, then the display settings selected at block 312 may be selected based on an aggregate of the plurality of obtained viewing profiles and the distances between each user (or group of users) and the display device. In at least one embodiment, the viewing profiles for each corresponding user—of the plurality of users identified as viewing the content—is accessed and one or more display settings that are mapped or correspond to the distance between a corresponding user and the display device are selected or obtained from that corresponding user's viewing profile. In this way, the values or settings for one or more display settings are selected for each corresponding user based on the distance between that corresponding user and the display device. The display settings for each corresponding user are then aggregated or combined to select one or more aggregated display settings for the plurality of users viewing the content. In some embodiments, the aggregated display settings include the same or similar display settings (or values) obtained from more than one viewing profile. For example, if two or more viewing profiles of the identified users have a same display setting value for their corresponding distance, then that display setting value is selected. In other embodiments, the aggregated display settings may be average or median display setting values. In yet other embodiments, the aggregated display settings may be some other aggregation or combination of display settings selected for the plurality of identified users based on the distances between those users and the display device.

Accordingly, process 300 may be employed to select and adjust display settings for a single user or for a plurality of users.

Moreover, process 300 may also be employed to adjust audio settings of audio being output of an audio device. These audio settings may include overall volume, bass setting, treble setting, timing shifts between multiple audio devices, etc. In at least one such embodiment, the distance determined at block 306 may be between the user and an audio device. In this way, the audio associated with content can be dynamically and automatically adjusted as a user moves around.

Figure 4:
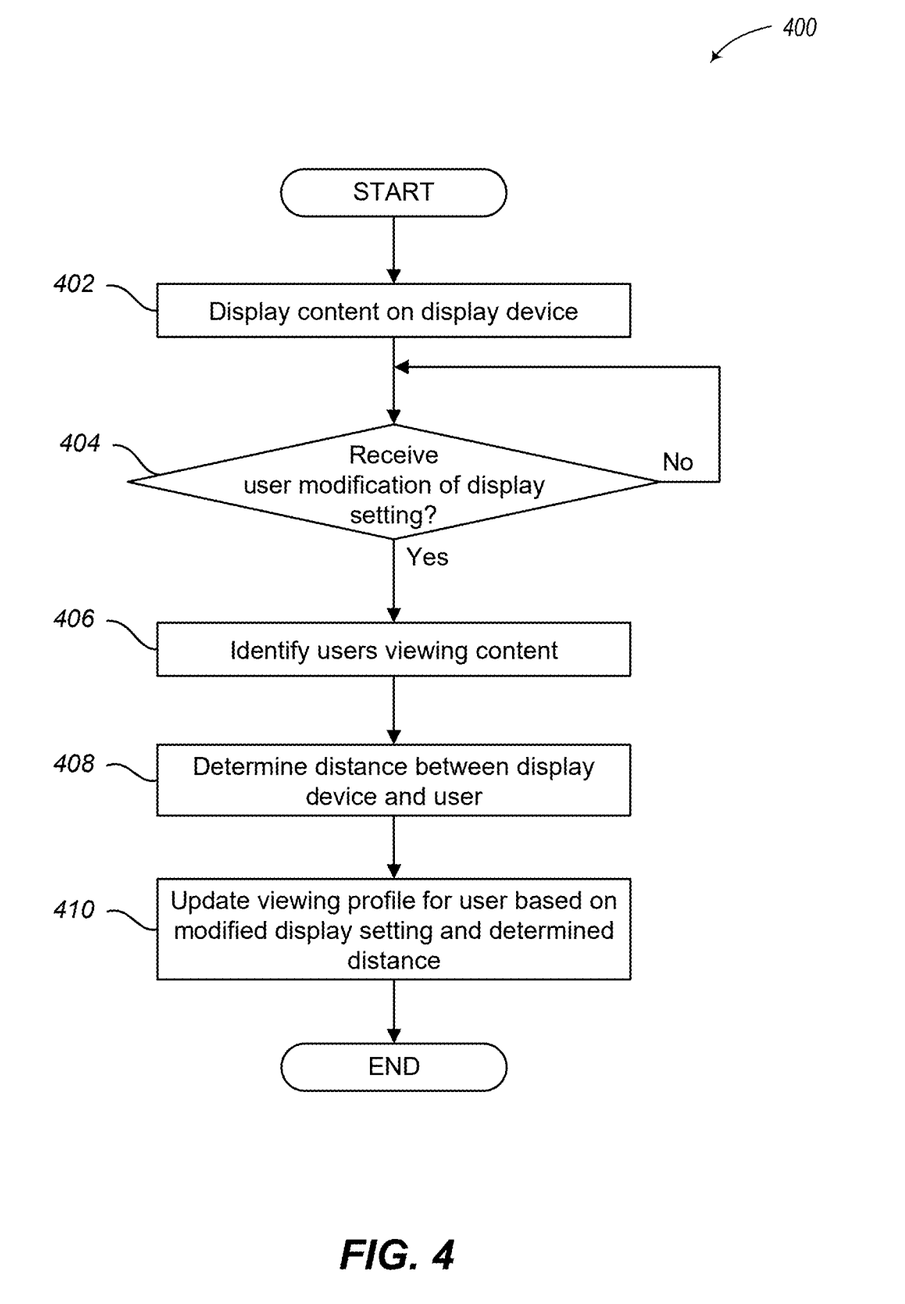
FIG. 4 illustrates a logical flow diagram showing one embodiment of a process for updating user profiles based on user modifications of display settings in accordance with embodiments described herein.

FIG. 4 illustrates a logical flow diagram showing one embodiment of a process 400 for updating user profiles based on user modifications of display settings in accordance with embodiments described herein.

Process 400 begins, after a start block, at block 402, where content is displayed on a display device (e.g., display device 124 in FIG. 2). In some embodiments, this display of content may be prior to any display adjustments made by process 300 in FIG. 3. In other embodiments, this display of content may be in response to adjustments made to the display of the content by process 300 in FIG. 3.

Process 400 proceeds after block 402 to decision block 404, where a determination is made whether one or more user modifications to the display settings have been received. If a user modification has been received, then process 400 flows to block 406; otherwise, process 400 loops to decision block 404 to wait until a user modification to the display settings is received. If no user modification is received during the display of the content, then process 400 terminates or otherwise returns to a calling process to perform other actions.

At block 406, one or more users who are viewing the content on the display device are identified. In various embodiments, block 406 may employ embodiments of block 304 in FIG. 3 to identify users.

Process 400 continues after block 406 at block 408, where a distance between the display device and the identified user is determined. In various embodiments, block 408 may employ embodiments of block 306 in FIG. 3 to determine the distance between the user and the display device.

Process 400 proceeds after block 408 to block 410, where the viewing profile of the user is updated based on the modified settings and the determined distance. For example, if the user adjusts the contrast to a specific value while being one meter away from the display device, then the viewing profile for that user may store that specific contrast value for one meter. In some embodiments, the type of content being displayed may also be stored with the modified display settings.

After block 410, process 400 terminates or otherwise returns to a calling process to perform other actions.

As discussed above, one or more users may be identified as viewing the content being displayed on the display device. In at least one such embodiment, the individual profiles of each identified user, or a group profile for a plurality of identified users, may be updated based on the modified display settings and the determined distances between the users and the display device.

Figure 5:
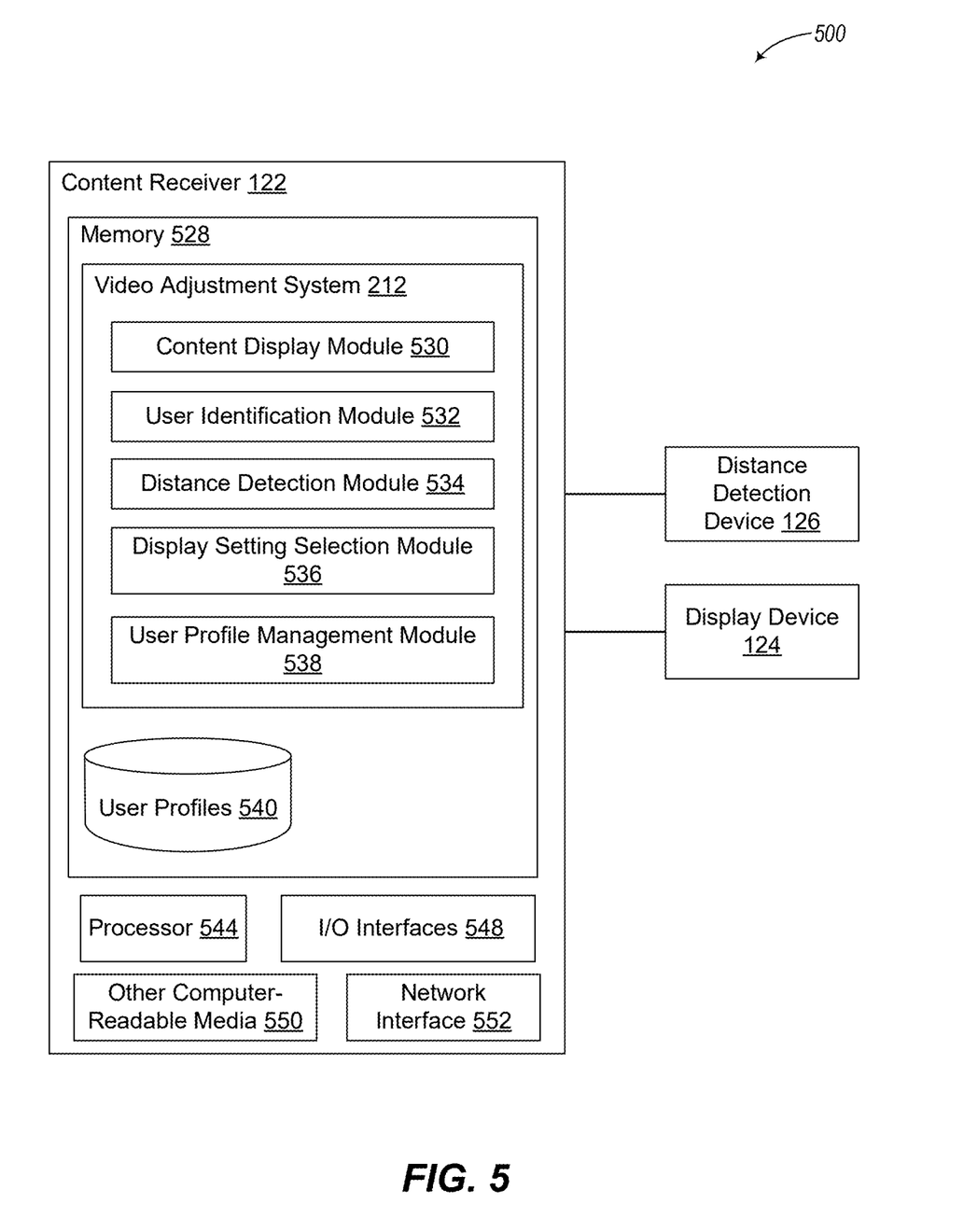
FIG. 5 shows a system diagram that describes one implementation of computing systems for implementing embodiments described herein.

FIG. 5 shows a system diagram that describes one implementation of computing systems for implementing embodiments described herein. System 500 includes content receiver 122, display device 124 and distance detection device, similar to what is described above in conjunction with FIGS. 1 and 2.

As described herein, the content receiver 122 is a computing device that can perform functionality described herein for dynamically adjusting display settings for a user based on the distance between the user and the display device. One or more special purpose computing systems may be used to implement the content receiver 122. Accordingly, various embodiments described herein may be implemented in software, hardware, firmware, or in some combination thereof. The content receiver 122 includes memory 528, processor 544, network interface 552, input/output (I/O) interfaces 548, and other computer-readable media 550.

Processor 544 includes one or more processors, one or more processing units, programmable logic, circuitry, or one or more other computing components that are configured to perform embodiments described herein or to execute computer instructions to perform embodiments described herein. In some embodiments, a processor system may include a single processor 544 that operates individually to perform actions. In other embodiments, a processor system may include a plurality of processors 544 that operate to collectively perform actions, such that one or more processors 544 may operate to perform some, but not all, of such actions. Reference herein to "a processor system" refers to one or more processors 544 that individually or collectively perform actions. And reference herein to "the processor system" refers 1) a subset or all of the one or more processors 544 comprised by "a processor system" and 2) any combination of the one or more processors 544 comprised by "a processor system" and one or more other processors 544.

Memory 528 may include one or more various types of non-volatile or volatile storage technologies. Examples of memory 528 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 528 may be utilized to store information, including computer-readable instructions that are utilized by a processor system to perform actions, including at least some embodiments described herein.

Memory 528 may have stored thereon video adjustment system 212, which is described in more detail herein. In various embodiments, the video adjustment system 212 may include a content display module 530, a user identification module 532, a distance detection module 534, a display setting selection module 536, and a user profile management module 538.

The content display module 530 is configured to receive content and display such content on the display device 124. The user identification module 532 is configured to identify a user that is viewing the content being displayed. The distance detection module 534 is configured to receive distance-related information or data from the distance detection device 126 and determine the distance between the user and the display device 124. The display setting selection module 536 is configured to select one or more display settings related to the display of the content on the display device based on the identified user and their distance from the display device 124. And the user profile management module 538 is configured to manage one or more viewing profiles for one or more users, where each viewing profile store mappings between display setting values or settings and corresponding distances for a corresponding user. Although the content display module 530, the user identification module 532, the distance detection module 534, the display setting selection module 536, and the user profile management module 538 are illustrated as separate modules, embodiments are not so limited. Rather, the functionality of the content display module 530, the user identification module 532, the distance detection module 534, the display setting selection module 536, and the user profile management module 538 may be performed or implemented by one module or a plurality of modules.

Memory 528 may include a user profiles database 540 for storing viewing profiles or other profiles for one or more users. Memory 528 may also store operating systems, user applications, or other computer programs.

Network interface 552 is configured to communicate with other computing devices, such as to receive content to be displayed on the display device 124. I/O interfaces 548 may include interfaces for various other input or output devices, including distance detection device 126 or display device 124. The I/O interfaces 548 may also include interfaces for other input output devise, such as USB interfaces, physical buttons, keyboards, haptic interfaces, tactile interfaces, or the like. Other computer-readable media 550 may include other types of stationary or removable computer-readable media, such as removable flash drives, external hard drives, or the like.

The following is a summarization of the claims as originally filed.

A method may be summarized as comprising: displaying content on a display device; identifying a user viewing the content on the display device; determining a distance between the user and the display device; selecting a display setting associated with the user based on the determined distance; and automatically adjusting display of the content on the display device based on the selected display setting.

The method may select the display setting by: obtaining a viewing profile for the user, wherein the viewing profile maps display settings to different viewing distances; and selecting the display setting from the viewing profile that maps to the determined distance.

The method may select the display setting by: selecting a value of a display setting that corresponds to the determined distance for the user.

The method may select the display setting by: selecting at least one random display setting independent of the user and the determined distance.

The method may further comprise: determining a second distance between the user and the display device; selecting a second display setting associated with the user based on the determined second distance; and automatically adjusting display of the content on the display device based on the selected second display setting.

The method may further comprise: identifying a second user viewing the content on the display device; determining a second distance between the second user and the display device; selecting a second display setting associated with the second user based on the determined second distance; aggregating the second display setting selected for the second user with the display setting selected for the user; and automatically adjusting display of the content on the display device based on the aggregated display settings.

The method may further comprise: identifying a second user viewing the content on the display device; determining a second distance between the second user and the display device; obtaining a group viewing profile for the user and the second user; and selecting the display setting from the group viewing profile that maps to a combination between the determined distance for the user and the determined second distance for the second user.

The method may further comprise: receiving a user modification to the display setting; and updating a viewing profile of the user based on the user modification to the display setting and the determined distance.

The method may further comprise: outputting audio content from an audio device; determining a second distance between the user and the audio device; selecting an audio setting associated with the user based on the determined second distance; and automatically adjusting output of the audio content from the audio device based on the selected audio setting.

A system may be summarized as comprising: a display device configured to display content; distance detection device configured to obtain information regarding a distance between a user and the display device; and a content receiver. The content receiver is configured to: provide the content to the display device; identify the user viewing the content on the display device; determine the distance between the user and the display device based on the information obtained by the distance detection device; select a display setting associated with the user based on the determined distance; and automatically adjust display of the content on the display device based on the selected display setting.

The distance detection device of the system may be a LiDAR sensor.

The distance detection device of the system may be a camera configured to capture images of the user. And the content receiver of the system may be configured to determine the distance between the user and the display device based on a position of the camera relative to the display device and a location of the user in the images.

The content receiver of the system may select the display setting by being configured to: obtain a viewing profile for the user, wherein the viewing profile maps display settings to different viewing distances; select the display setting from the viewing profile that maps to the determined distance.

The content receiver of the system may select the display setting by being configured to: select a value of a display setting that corresponds to the determined distance for the user.

The content receiver of the system may be further configured to: determine a second distance between the user and the display device; select a second display setting associated with the user based on the determined second distance; and automatically adjust display of the content on the display device based on the selected second display setting.

The content receiver of the system may be further configured to: identify a second user viewing the content on the display device; determine a second distance between the second user and the display device; select a second display setting associated with the second user based on the determined second distance; aggregate the second display setting selected for the second user with the display setting selected for the user; and automatically adjust display of the content on the display device based on the aggregated display settings.

The content receiver of the system may be further configured to: identify a second user viewing the content on the display device; determine a second distance between the second user and the display device; obtain a group viewing profile for the user and the second user; select the display setting from the group viewing profile that maps to a combination between the determined distance for the user and the determined second distance for the second user.

The content receiver of the system may be further configured to: receive a user modification to the display setting; and update a viewing profile of the user based on the user modification to the display setting and the determined distance.

The system may further comprise: an audio device configured to output audio associated with the content. The content receiver of the system may be further configured to: provide the audio to the audio device to be output to the user; determine a second distance between the user and the audio device; select an audio setting associated with the user based on the determined second distance; and automatically adjust output of the audio from the audio device based on the selected audio setting.

A non-transitory computer-readable medium may be summarized as storing computer instructions that, when executed by at least one processor, cause the at least one processor to perform actions, the actions comprising: storing a viewing profile for a user, wherein the viewing profile maps display settings to different viewing distances; displaying content on a display device to the user; determining a distance between the user and the display device; accessing the viewing profile to select a display setting from the viewing profile that maps to the determined distance; automatically adjusting display of the content on the display device based on the selected display setting; receiving a user modification to the display setting; and updating the viewing profile of the user based on the user modification to the display setting and the determined distance.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   displaying content on a display device;
   identifying a first user and a second user as viewing the content on the display device;
   selecting a display setting;
   determining a first distance between the first user and the display device;

selecting, based on the determined first distance, a first setting for the selected display setting;
determining a second distance between the second user and the display device;
selecting, based on the determined second distance, a second setting for the selected display setting;
combining the first setting for the selected display setting with the second setting for the display setting into a combined setting for the selected display setting; and
automatically adjusting display of the content on the display device based on the combined setting for the selected display setting.

2. The method of claim 1, wherein selecting the first setting for the selected display setting comprises:
selecting a value of the selected display setting from a profile of the first user, wherein the value maps to the determined first distance for the first user.

3. The method of claim 1, wherein selecting the display setting comprises:
selecting at least one random display setting independent of the first user, the second user, the determined first distance, and the determined second distance.

4. The method of claim 1, further comprising:
receiving a user modification to the first setting of the selected display setting; and
updating a viewing profile of the first user based on the user modification and the determined first distance.

5. The method of claim 1, further comprising:
outputting audio content from an audio device;
determining another distance between the first user and the audio device;
selecting an audio setting associated with the first user based on the determined other distance; and
automatically adjusting output of the audio content from the audio device based on the selected audio setting.

6. A system, comprising:
a display device configured to display content;
distance detection device configured to obtain information regarding distances between users and the display device; and
a content receiver configured to
provide the content to the display device;
identify a first user viewing the content on the display device;
determine a first distance between the first user and the display device based on the information obtained by the distance detection device;
select a first display setting for a type of display setting associated with the first user based on the determined first distance;
identify a second user viewing the content on the display device;
determine a second distance between the second user and the display device based on the information obtained by the distance detection device;
select a second display setting for the type of display setting associated with the second user based on the determined second distance;
aggregate the first display setting selected for the first user with the second display setting selected for the second user into an aggregated display setting for the type of display setting; and
automatically adjust display of the content on the display device based on the aggregated display setting for the type of display setting.

7. The system of claim 6, wherein the distance detection device is a LiDAR sensor.

8. The system of claim 6, wherein the distance detection device is a camera configured to capture images of users, and wherein the content receiver is configured to determine the first distance between the first user and the display device based on a position of the camera relative to the display device and a location of the first user in the images.

9. The system of claim 6, wherein the content receiver selects the first display setting by being configured to:
obtain a viewing profile for the first user, wherein the viewing profile maps display settings to different viewing distances for the first user;
select the first display setting from the viewing profile that maps to the determined first distance.

10. The system of claim 6, wherein the content receiver selects the first display setting by being configured to:
select a value for the type of a-display setting that corresponds to the determined first distance for the first user.

11. The system of claim 6, wherein the content receiver is further configured to:
obtain a group viewing profile for the first user and the second user;
adjust the aggregated display setting from the group viewing profile that maps to a combination between the determined first distance for the first user and the determined second distance for the second user.

12. The system of claim 6, wherein the content receiver is further configured to:
receive a user modification to the first display setting; and
update a viewing profile of the first user based on the user modification to the first display setting and the determined first distance.

13. The system of claim 6, further comprising:
an audio device configured to output audio associated with the content; and
wherein the content receiver is further configured to:
provide the audio to the audio device to be output to the first user;
determine a third distance between the first user and the audio device;
select an audio setting associated with the first user based on the determined third distance; and
automatically adjust output of the audio from the audio device based on the selected audio setting.

14. A non-transitory computer-readable medium storing computer instructions that, when executed by at least one processor, cause the at least one processor to perform actions, the actions comprising:
storing a group viewing profile for a first user and a second user, wherein the group viewing profile maps each of a plurality of display settings to a corresponding viewing distance of a plurality of different viewing distances;
displaying content on a display device to the first user and the second user;
determining a first distance between the first user and the display device;
determining a second distance between the second user and the display device;
determining a shared distance between from the determined first distance and the determined second distance;
accessing the group viewing profile to select a display setting from the plurality of display settings that maps to the determined shared distance in the plurality of different viewing distances;

automatically adjusting display of the content on the display device based on the selected display setting;

receiving a user modification to the display setting; and updating the group viewing profile based on the user modification to the display setting and the determined shared distance.

15. The method of claim 1, comprises:

wherein selecting the first setting for the selected display setting includes:

selecting a first value for the selected display setting from a first profile of the first user, wherein the first value maps to the determined first distance for the first user;

wherein selecting the second setting for the selected display setting includes:

selecting a second value for the selected display setting from a second profile of the second user, wherein the second value maps to the determined second distance for the second user; and wherein combining the first setting for the selected display setting with the second setting for the display setting, includes:

combining the first value and the second value into the combined setting for the selected display setting.

16. The method of claim 15, combining the first value and the second value comprises:

averaging the first value and the second value into an averaged setting value for the selected display setting.

17. The method of claim 1, wherein selecting the display setting comprises:

determining a types of the display device from a plurality of different types of display devices; and selecting the display setting based on the type of the display device.

18. The method of claim 1, further comprising:

receiving a user modification to the combined value for the selected display setting; and updating a viewing profile of the first user based on the user modification and the determined first distance.

19. The system of claim 6, wherein the content receiver is further configured to:

receive a user modification to the aggregated display setting; and update a viewing profile of the first user based on the user modification and the determined first distance.

* * * * *